United States Patent [19]

Garcea et al.

[11] Patent Number: 4,539,944
[45] Date of Patent: Sep. 10, 1985

[54] TEMPERATURE-CONTROLLING SYSTEM FOR THE LIQUID COOLANT OF A MOTOR CAR INTERNAL-COMBUSTION ENGINE

[75] Inventors: Giampaolo Garcea; Filippo Surace, both of Milan, Italy

[73] Assignee: Alfa Romeo Auto S.p.A., Naples, Italy

[21] Appl. No.: 364,313

[22] Filed: Apr. 1, 1982

[30] Foreign Application Priority Data

Apr. 6, 1981 [IT] Italy ................. 20948 A/81

[51] Int. Cl.³ ............................ F01P 5/06; F01P 7/16
[52] U.S. Cl. ................. 123/41.06; 123/41.1; 123/11.12; 180/68.1
[58] Field of Search ............ 123/41.05, 41.06, 41.08, 123/41.09, 41.1, 41.12, 41.02, 41.56, 41.58, 41.7; 236/35.2, 35.3; 180/54 A; 165/41, 42, 44, 51

[56] References Cited

U.S. PATENT DOCUMENTS

| | | | |
|---|---|---|---|
| 1,558,009 | 10/1925 | Giesler | 123/41.1 |
| 1,820,091 | 8/1931 | Reavis | 123/41.05 |
| 2,322,661 | 6/1943 | Paton | 236/35.2 |
| 2,783,978 | 3/1957 | Baumgarten | 123/41.04 |
| 3,805,748 | 4/1974 | Garcea et al. | 123/41.1 |
| 3,851,629 | 12/1974 | Mayer et al. | 123/41.09 |

FOREIGN PATENT DOCUMENTS 2631121  1/1978  Fed. Rep. of Germany ... 123/41.05

*Primary Examiner*—William A. Cuchlinski, Jr.
*Attorney, Agent, or Firm*—Charles A. Brown; Charles E. Brown

[57] ABSTRACT

This invention relates to a temperature-controlling system for the liquid coolant of an internal-combustion engine, which provides three sensing members for the temperature of said liquid in the outlet conduit from the cylinder block. Said sensors are intended to drive a valve which controls the flow of the liquid through a conduit which by-passes the radiator, a vane which controls the flow of air through a port formed through the car body, and a fan which cools said radiator respectively.

4 Claims, 1 Drawing Figure

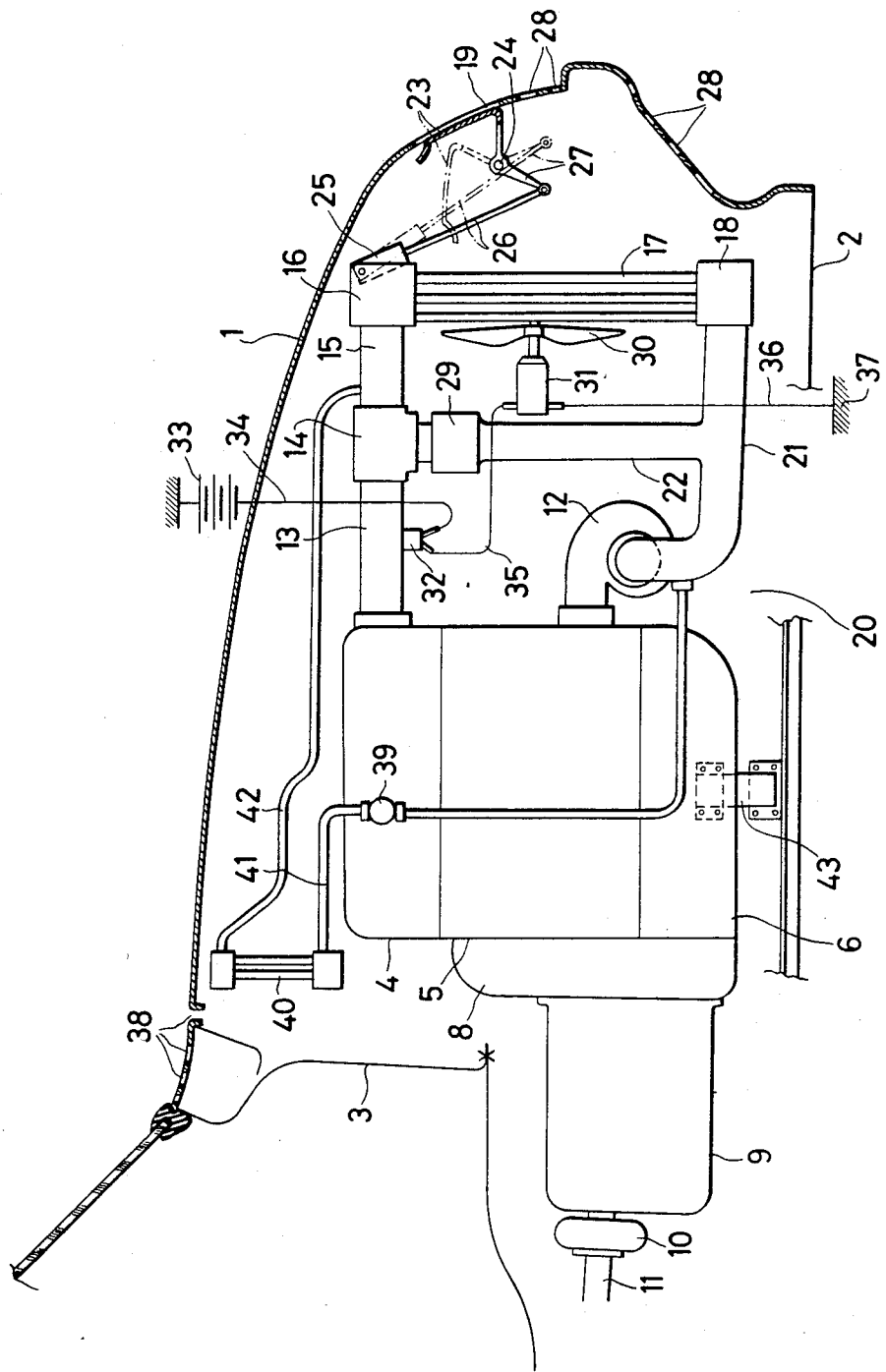

TEMPERATURE-CONTROLLING SYSTEM FOR THE LIQUID COOLANT OF A MOTOR CAR INTERNAL-COMBUSTION ENGINE

BACKGROUND OF THE INVENTION

It is known that, in the motor vehicles driven by a liquid-cooled internal-combustion engine, the quantity of heat transferred by the engine to the liquid coolant is progressively given off to the environmental air by the intermediary of a radiator. The latter consists of a bundle of tubes having more or less crowded gills, the liquid coolant flowing inside the tubes, whereas the air which flows across the tube bundle sweeps the tubes externally.

It is likewise known that, at a determined point of the loop, for example at the outlet from the engine, the temperature of the liquid coolant is maintained to a certain value (selected beforehand as an optimum for the operation of the engine concerned) because the liquid flow loop comprises, in addition to the engine, the radiator and a circulation pump, also thermostatically controlled valve.

The latter valve reduces the rate of flow of the liquid flowing through the radiator as the temperature tends to drop with respect to the preselected value, and increases such rate of flow in the contrary instance: consequently, the quantity of heat transfered from the liquid to the environmental air is reduced or is increased, respectively.

Generally speaking, therefore, the rate of flow of the air which flows across the radiator tube bundle is not modified.

It is known that such a rate of flow of air is unusually generated by virtue of the fact that the radiator is arranged crosswise in a compartment internally of the vehicle, said compartment having one or more air-intake ports arranged in a pressural area of the aerodynamic field which surrounds the vehicle, and one or more air outlet ports arranged in a negative pressure area or, anyhow, in an area in which a pressure obtains which is smaller than that obtaining at the air intake ports.

By so doing, the rate of flow of the air is virtually proportional to the vehicle advance speed: at low speeds, especially under certain particular conditions of environment and use, the rate of flow of the air is generally inadequate. In order that the rate of flow of air may be matched to the requirements inherent in such conditions of use, the magnitude of the rate of flow of air is generally increased by means of a specially provided fan.

SUMMARY OF THE INVENTION

The thermostatic-control system provided by this invention affords, over such conventional approaches, the advantage of reducing the overall fuel consumption of the vehicle: this is obtained, in the first place, by reducing the aerodynamic drag on the vehicle, but also by reducing the magnitude of the losses due to the internal frictional resisting forces in an engine which is not yet in its thermal steady state.

In order to explain how the drag might be reduced, it should be recalled that the magnitude of the power loss $N_a$ induced by the drag is given by the relationship:

$$N_a = C_x \cdot \rho \cdot S \cdot W^3 \qquad (1)$$

wherein $C_X$ is a coefficient the value of which is the lesser, the more appropriate is the aerodynamic (streamline) shape of the car body, $\rho$ is the density of the environmental air, S is the area of the main section of the vehicle and W is the advance speed. However, since there are, as outlined above, a compartment in the vehicle interior which communicates with the outside atmosphere through an air intake port (generally in the front section of the vehicle) and an air outlet port (generally below the vehicle), this compartment has an air stream flowing therethrough as caused by the effect of the pressural field around the vehicle. Thus, the power loss $N_a$ aforesaid is supplemented by an additional power loss $N_r$, which can be written as follows:

$$N_r = K \cdot \rho \cdot A \cdot W^3 \qquad (2)$$

wherein K is a coefficient the value of which is the ratio between the pressure differential at the intake and the outlet (due to the aerodynamic field), and the dynamic pressure ($\frac{1}{2} \cdot \rho \cdot W^2$), whereas A is the area of the flow passage surface in the interior of the vehicle.

As a rule, the magnitude of $N_r$ is not negligible with respect to $N_a$ because the radiator is arranged crosswise in the interior of the engine compartment, so that the ports through which the air enters, flows and exits must be so wide as to permit the requested withdrawal of heat from the liquid coolant even in the worst conditions of use of the vehicle from this particular standpoint, such as very high environmental temperature, a high power expenditure (steep hills, taking in tow). However, such an oversizing of the ports and the attendant power loss value $N_r$ are not at all justified for the remainder of the field of use of the vehicle. Just to the purpose of avoiding exceedingly high and thus unjustified values of the lower loss $N_r$ under the normal conditions of use, in the system according to the present invention it is suggested to adopt variable-area ports either for the inlet or for the outlet of the compartment internal to the vehicle, so as to achieve not only an adjustment of the rate of flow of the liquid coolant through the radiator, but also an adjustment, optionally automatic, of the rate of flow of the air which flows across the radiator.

The variability of the areas of the intake or the outlet ports according to the regulation system suggested herein, is also intended to reduce, as outlined above, the losses due to the stronger internal frictional forces which are experienced in a cold started engine until the engine has not attained its thermal steady state.

It is known, in fact, that the fuel consumption by a motor car is heavily influenced by the portion of a journey traveled with the engine which has not yet reached its thermal steady state, said influence being still greater if the vehicle is used for very short trips interspersed with long rest times. As a matter of fact, the regulation system suggested herein shortens as far as practicable the engine warm up time, that is, the time which is required to attain the thermal steady state for the entire engine and especially for those internal component parts of the engine for which the maximum frictional forces in the cold are experienced.

This result is achieved, above all, because, as the engine is not yet in its steady state, the rate of flow of the air which flows through the vehicle engine compartment is reduced to a very small value or is even annulled, so that the heat transferred by the gases to the cylinder walls and/or by the frictional forces generated by the surfaces of mutually engaging members is prevented from being withdrawn, in part, by the air sweeping the engine and thus not fully exploited for warming the engine up.

According to a particular embodiment, the system further provides for keeping to a very low value, or even to nil, also the rate of flow of the liquid coolant flowing through the engine, so that all the heat yielded by the gases to the cylinder walls and the heat generated by the piston friction is used for heating the cylinder liners as quickly as possible and the comparatively small volume of liquid surrounding them. The temperature of the cylinder liners predominantly governs the temperature and thus the viscosity of the oil film between the liners and the respective pistons: a quick heating of the liners thus originates a quick decrease of the friction between the piston and the liner and thus a reduction of the overall fuel consumption by the vehicle especially if the environmental temperatures are low and the vehicle concerned is used for short trips interspersed with long rest times.

BRIEF DESCRIPTION OF THE DRAWING

FIG. 1 is a schematic elevational view of a cooling system for air internal combustion engine embodying the present invention;

What has been set forth hereinbefore will be better explained with reference to the accompanying drawing, the single FIGURE of which diagrammatically and exemplarily reports, without limitation, one of the possible embodiments of the system in cross-sectional view taken along a longitudinal vertical plane, the front portion of a motor car having a front engine being shown. In the FIGURE, the reference numeral 1 indicates the wall, generally of sheet metal, which confines the vehicle front portion at the top and frontally, 2 is a similar wall which provides the front and the bottom boundaries, 3 is the wall which separates the vehicle front section, shown in the drawing, from the central and the rear sections which have not been shown in the drawing.

The space as internally delimited by the walls 1, 2 and 3 is generally termed a bonnet or a hood and is also confined by the car sidewalls (not shown in the drawing). The numerals 4, 5 and 6 indicate the cylinder head, the crankcase and the lower crankcase (oil sump) of the motor car engine, respectively. In addition, the reference numerals 8, 9, 10 and 11 indicate the clutch casing, the gearbox, the joint and the transmission shaft at the exit of the gearbox, 12 is the circulating pump having its driving shaft for supplying the liquid coolant to the conduits and jackets properly formed in the engine, 13 is the pipe for drawing said liquid from the engine, 14 is a first sensor in the form of a two-way thermostatic valve, 15 is a conduit connecting the first of these two ways to the radiator upper chamber 16 which, together with the tube bundle 17 and the lower chamber 18 makes up the radiator structure. In the interior of the tubes 17 the liquid coolant flows from the chamber 16 to the chamber 18 and can thus be cooled giving off heat to the airstream which, for example due to the effect of the aerodynamic field which surrounds the car, enters frontally thereinto through the port 19 into the space confined by the walls 1, 2 and 3, flows across the tube bundle 17 and sweeps the outer surface thereof which is generally finned and flows out through the port 20 formed in the lower portion 2 of the car. In addition, the numeral 21 indicates a duct which connects the radiator chamber 18 to the intake side of the pump 12 and 22 indicates a conduit which connects the second of the two ways of the valve 14 to the duct 21 and thus to the intake of the pump 12. Moreover, 23 indicates a moving vane which swings about a pin 24 and can be so positioned as to shut, or throttle, or leave wide open the air inlet port 19. The radiator upper chamber 16 has integrally connected thereto a second thermostatic sensor 25, for example of the wax expansion type, which shifts, as a function of the temperature of the liquid in the chamber 16, either end of a rod 26, the other end of which is secured to a lever 27. The latter lever is secured to the moving vane 23 so that an increase of the temperature of the liquid coolant brings about an increase of the unmasked area of the inlet port, and vice versa. At 28 there are indicated the air inlet ports and, at 29, there is an automatic valve inserted into the conduit 22, which connects the second of the two ways of the thermostatic valve 14 to the conduit 21.

In the interior of the valve 29 a moving shutter not shown in the drawing, is held in the position of maximum closure for the valve by a preloaded spring, also not shown, whereas the shutter is shifted to the maximum opening position whenever the difference between the liquid pressure upstream of the valve and the pressure downstream thereof acts upon the shutter because the spring preload has been exceeded. In as much as the pressure differential is a function of the pump head and the latter is increased as the engine rpm is increased, the automatic valve 29 thus minimizes, until the engine is still cold, the rate of flow of the liquid flowing therethrough, provided that the engine rpm does not exceed a certain value. If the engine is used above such an engine rpm, a circulation of liquid in its interior is desirable even if the engine is still cold. At 30 there is indicated the fan rotor and at 31 the electric motor for an electric fan which is intended to provide or to increase the air flow across the tube bundle 17 of the radiator when the car is stationary but the engine is running or as the vehicle runs at a low speed, so that the temperature of the liquid might exceed the value which has been preselected as the maximum value. At 32 there is indicated a third sensor having the form of a thermostatic electric switch, just as the temperature of the liquid exceed the value aforesaid, feeds the motor 31 with current from the storage battery 33 via the leads 34, 35, 36, the ground wire being shown at 37.

According to another possible embodiment of the system disclosed herein, the fan rotor 30 can directly be controlled by the internal combustion engine mainshaft, optionally by means of clutch which is automatically engaged above said temperature as preselected for the liquid. At 40 there is indicated a secondary radiator which is arranged in another compartment, different from the compartment which contains the main radiator. The secondary radiator is connected in parallel relative to the main radiator by the small pipes 41 and 42 inserted in the engine liquid coolant loop. The secondary radiator 40 is intended to preheat the air entering through the ports 38 into the passenger compartment when the adjustment cock 39 is opened. The numeral 43 indicates the engine lug.

The regulation provided for the several component parts of the system as described above is such that, when the engine is started with the engine itself and the liquid coolant cold, the moving vane 23 is held by the thermostat 25 in the closed position. In addition, the thermostatic valve 14 keeps the outlet towards the radiator chamber 16 closed whereas the second port which short-circuits the radiator is open. The automatic valve 29 is also in its closure, or maximum closure position and the fan 30 is stationary. As the engine is started and the car is either stationary or moving, if a certain engine rpm is not exceeded (e.g., 3000 rpm) at which the pump 12 head overcomes the calibration value for the spring mounted internally of the valve 29, the rate of flow of the liquid through the engine is at a minimum or is nil. Both the heat transferred from the gases to the cylinder walls and the heat produced by the friction between the piston and the cylinder liner are entirely exploited to warm the cylinder liners and the small liquid volume surrounding them and which is virtually stationary or is actually stationary. In as much as also the rate of flow of air flowing through the engine compartment is at a minimum or is nil, also the heat transfer from the external walls of the engine is minimized. The result is a drastic cutdown in the engine warm up time and thus a corresponding reduction of the power losses caused by the increased frictional forces at a low temperature, especially between the liners and the pistons. As soon as such a configuration of the system is arrived at and a first temperature $t_1$ for the liquid is reached, the system configuration undergoes a first change because the first "way" of the thermostatic valve 14 (towards the radiator) begins to open progressively, while the second "way" begins to close. Thus, the rate of flow of the liquid coolant grows more and more both through the radiator and through the engine: during this stage, the moving vane 23 is still in its closure (or maximum closure) position so that the rate of flow of the air which flows across the radiator and sweeps the engine from the outside is at a minimum. If, consistently with the conditions of use of the car and the environmental conditions, a temperature $t_2$ is reached, which is somewhat above $t_1$, the first "way" of the valve 14 is fully open and the second "way" fully closed so that the rate of flow of the liquid coolant through the radiator and the engine is at a maximum consistently with each rpm as adjusted by the "head" of the pump 12. If, due to the further conditions of use and environmental conditions the liquid coolant attains and exceeds a third temperature, $t_3$, somewhat above $t_2$, the configuration of the system is modified once more because the thermostat 25 begins gradually to open the air inlet port 19, so that the radiator is gradually receiving more and more air through the port 19 and the engine is more and more intensely swept externally by said air. Thus, it is only at a temperature of the liquid over $t_3$ that the power loss due to the drag, $N_a$, begins to be summed to the additional power loss $N_r$ indicated above, but the magnitude of $N_r$ is always kept to the minimum possible value consistently with the necessity of conditioning the liquid between the temperature $t_3$ and a higher temperature $t_4$ at which the thermostat 25 brings the moving vane 23 to a position of widest aperture of the port 19. If, due to the further conditions of use and the environmental conditions the temperature of the liquid exceeds another value, $t_5$, somewhat above $t_4$, the thermostatic electric switch 32 feeds with current the motor 31 of the electric fan so that the latter enters action and boosts or increases the rate of flow of the air flowing across the radiator and sweeping the engine until the temperature of the liquid drops to a value, $t_6$, which is intermediate between $t_4$ and $t_5$ and at which point the motor 31 is de-energized by the switch 32. As regards the secondary radiator 40, which is also inserted, like the main radiator, downstream of the thermostatic valve, 14, the liquid flows therethrough only when the temperature is higher than $t_1$, so that its presence does not modify the mode of operation of the system, which is optimized so as to minimize the time necessary to initially bringing the engine to its steady thermal state, more particularly the steady conditions of those component parts of the engine which have an influence on the internal frictional forces and thus on the increased fuel consumption when the engine is not yet in its steady condition.

We claim:

1. A system for controlling the temperature of the liquid coolant for a motor car internal combustion engine of a kind comprising: a radiator connected to the engine cylinder block by an inlet duct and an outlet duct for the liquid coolant, said inlet duct and said outlet duct being interconnected by a third duct which by-passes the radiator, a control valve in said third duct for controlling the flow of liquid coolant through said third duct, a circulating pump for said liquid coolant, a cooling fan for said radiator which also receives an airflow coming from a primary port and a secondary port through the car body for directing air to and through said radiator, said cooling fan having a controllable drive and there being a vane for controlling airflow through said primary port, said vane having a positioning mechanism, said systems including a sensing device for sensing three temperature levels of the liquid coolant in the outlet duct from the cylinder block; said sensing device including means for sensing a first temperature of a predetermined level and in response to the temperature sensing positioning the valve which controls the flow of the liquid through said third by-pass duct, means for sensing a second temperature having a level above the level of the first temperature and being operatively connected to said controllable drive for controlling actuation of said fan drive, and means for sensing a third temperature which is at a level between the levels of said second temperature and said first temperature and connected to said vane positioning mechanism to control the position of said vane and thereby control the flow of air to said radiator through said car body primary port.

2. A temperature controlling system according to claim 1, wherein said secondary port is positioned beneath the primary port.

3. A temperature controlling system according to claim 2, wherein said moving vane is positioned at an upper portion of said radiator so as to direct incoming air to a hottest portion of said radiator.

4. A temperature controlling system according to claim 1 wherein said means of said sensing device are in the form of three separate sensors.

* * * * *